US012601425B2

(12) United States Patent
Boutier et al.

(10) Patent No.: US 12,601,425 B2
(45) Date of Patent: Apr. 14, 2026

(54) DEVICE FOR ATTACHING AN ELEMENT TO A PART OF A MOTOR VEHICLE

(71) Applicant: Plastic Omnium Advanced Innovation and Research, Brussels (BE)

(72) Inventors: Julien Boutier, Brussels (BE);
Kourosh Bahramian, Brussels (BE);
Eric Patte, Brussels (BE)

(73) Assignee: Plastic Omnium Advanced Innovation and Research, Brussels (BE)

( * ) Notice: Subject to any disclaimer, the term of this patent is extended or adjusted under 35 U.S.C. 154(b) by 164 days.

(21) Appl. No.: 18/578,084

(22) PCT Filed: Jul. 13, 2022

(86) PCT No.: PCT/EP2022/069560
§ 371 (c)(1),
(2) Date: Jan. 10, 2024

(87) PCT Pub. No.: WO2023/285512
PCT Pub. Date: Jan. 19, 2023

(65) Prior Publication Data
US 2024/0328540 A1 Oct. 3, 2024

(30) Foreign Application Priority Data
Jul. 15, 2021 (LU) ........................................ 102844

(51) Int. Cl.
*F16L 3/00* (2006.01)
*F16L 3/08* (2006.01)
(Continued)

(52) U.S. Cl.
CPC ................. *F16L 3/13* (2013.01); *F16L 3/085* (2013.01); *F16L 3/2431* (2019.08); *B60K 15/03* (2013.01); *B60K 2015/03315* (2013.01)

(58) Field of Classification Search
None
See application file for complete search history.

(56) References Cited

U.S. PATENT DOCUMENTS 5,342,139 A * 8/1994 Hoffman ................. F16B 5/065
267/64.23
2006/0102401 A1* 5/2006 Pellillo .............. B62D 25/2027
180/69.1
(Continued)

FOREIGN PATENT DOCUMENTS

DE 10 2019 128 912 B3 11/2020
FR 2 824 615 A1 11/2002
(Continued)

OTHER PUBLICATIONS

International Search Report mailed on Sep. 26, 2022 in PCT/EP2022/069560 filed on Jul. 13, 2022 (citing references 1, 15-18 therein, 2 pages).

*Primary Examiner* — Steven M Marsh
(74) *Attorney, Agent, or Firm* — Oblon, McClelland, Maier & Neustadt, L.L.P.

(57) ABSTRACT

An attachment device for attaching an element to a support formed by a part of a motor vehicle, including a means for retaining the element, and a body capable of being attached to the support, the body being rigidly attached to the means for retaining the element. The body contains a first part and a second part which are rigidly attached, adjacent to one another and elastically deformable. The first part and the second part each have a concave inner surface. The first part and the second part extend in different planes transverse relative to each other.

17 Claims, 2 Drawing Sheets

(51) Int. Cl.

| | | |
|---|---|---|
| *F16L 3/13* | (2006.01) | |
| *F16L 3/24* | (2006.01) | |
| *B60K 15/03* | (2006.01) | |

(56) References Cited

U.S. PATENT DOCUMENTS

| | | | | |
|---|---|---|---|---|
| 2006/0289702 A1* | 12/2006 | Byers | ................... | B60G 15/067 |
| | | | | 248/49 |
| 2021/0071784 A1 | 3/2021 | Dodge et al. | | |
| 2025/0229618 A1* | 7/2025 | Landvik | ............... | B60K 15/067 |

FOREIGN PATENT DOCUMENTS

| | | | |
|---|---|---|---|
| FR | 3 052 605 A1 | 12/2017 |
| FR | 2 942 289 A1 | 8/2020 |
| WO | WO 2018/150419 A1 | 8/2018 |

* cited by examiner

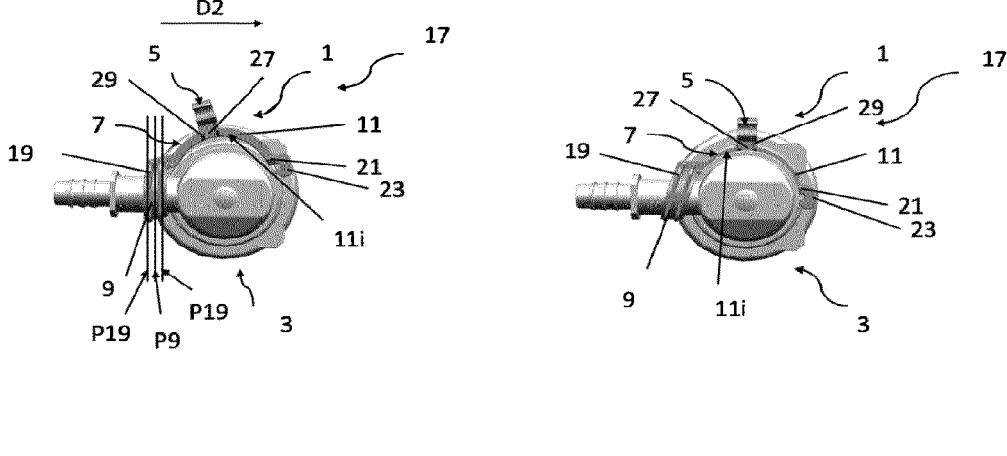
Fig. 1a
Fig. 1b
Fig. 2
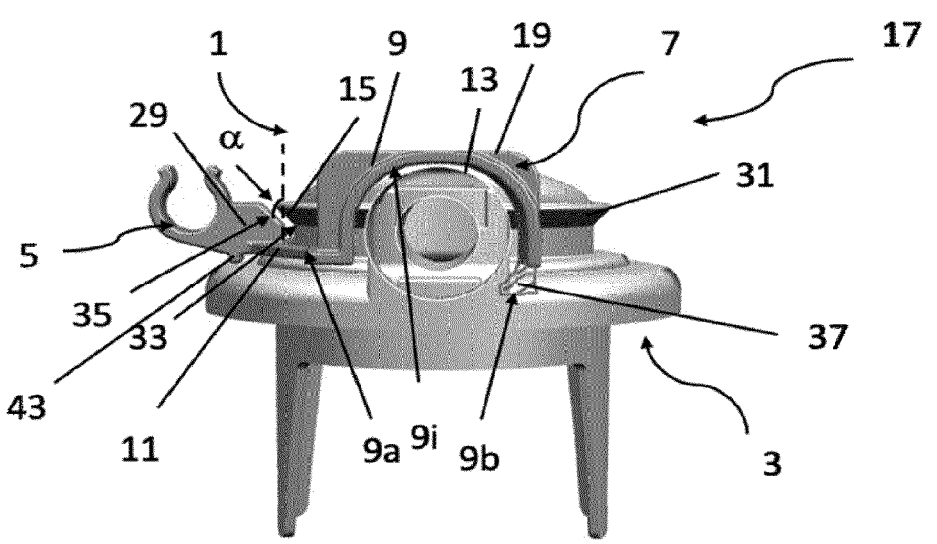

Fig. 3
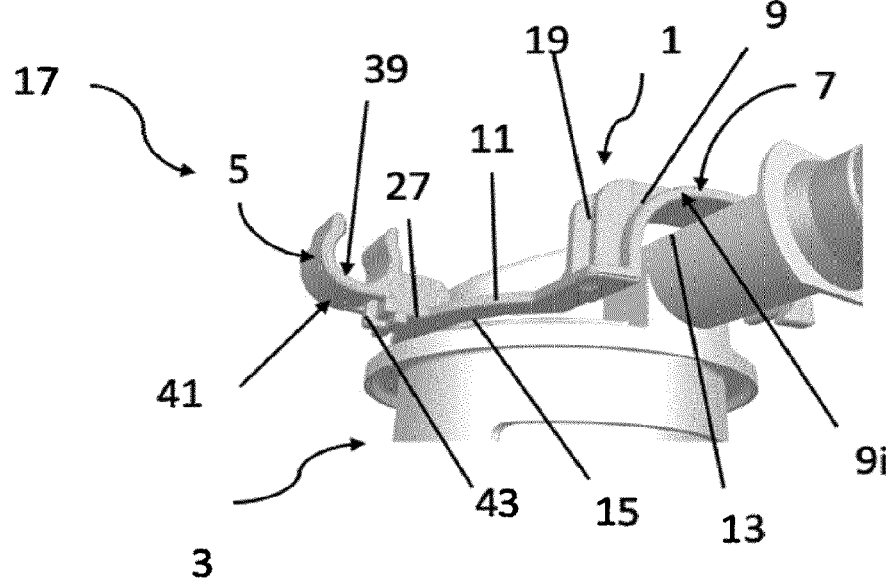
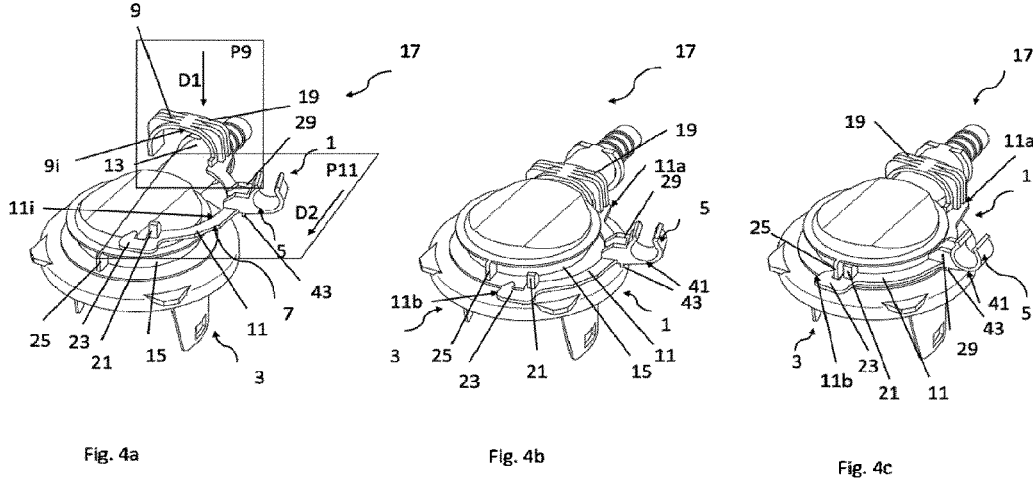
Fig. 4a          Fig. 4b          Fig. 4c

DEVICE FOR ATTACHING AN ELEMENT TO A PART OF A MOTOR VEHICLE

CROSS REFERENCE TO RELATED APPLICATIONS

This application is a National Stage entry under 35 U.S.C. § 371 of PCT/EP2022/069560, filed on Jul. 13, 2022, and claims priority to Luxembourg Patent Application No. LU102844, filed on Jul. 15, 2021. The entire contents of both are incorporated herein by reference.

BACKGROUND OF THE INVENTION

Field of the Invention

The invention relates to a device for attaching an element to a part of a motor vehicle, an attachment system comprising the attachment device and the motor vehicle part, a motor vehicle part comprising the attachment system, and a method for installing the element in a motor vehicle. The motor vehicle part is especially an inner or outer surface of a motor vehicle tank, a component of the tank intended to be mounted on one of said surfaces, or a chassis or frame comprising a plurality of hydrogen tanks. The tank is a tank of an operating fluid of the vehicle, that is to say for example a fuel, a urea solution, water, brake fluid, windscreen-washer fluid, etc. The invention relates for example to the attachment of a fuel intake line to a fuel tank. The element may also be another duct, for example a ventilation duct. However, it may be any other element that needs to be attached in the vicinity of the tank, such as for example a heat shield for the tank, a wiring harness, a brake cable, a cooling line of a cooling system, a pre-retaining system such as a strap for use during operations on the vehicle.

Description of the Related Art

A staple for attaching a duct of a braking circuit to a fuel tank is already known in the prior art, especially from document FR2942289. The attachment system described in this document requires the installation on the tank of a dedicated attachment device, namely a support. The support is for example welded to the casing of the tank. Such a system therefore requires the manufacture of a dedicated support and the installation thereof on the tank. It involves arranging on the tank an area large enough and accessible for welding or gluing an additional component thereto. However, such an area allowing the attaching of an additional component is not necessarily provided on an inner or outer surface of the tank.

Also known from document FR2824615 is a tab for attaching a pipe for a motor vehicle. The attachment tab can be locked into a hole of a motor vehicle body panel. The tab also comprises cradles for retaining the pipe.

Also known from document FR3052605 is a collar for retaining a wiring harness around a member located in the vicinity of an engine of a motor vehicle. The clamping collar comprises a portion for clamping the collar around a cylindrical area of the member. The clamping portion is connected to a portion for retaining the harness. To mount the harness, the gripping portion is clipped onto the cylindrical area and the retaining portion is translated to engage with a means for indexing the retaining portion with a complementary indexing means of a braking member. In order to attach the wiring harness, the clamping collar therefore requires the presence, in a member in the vicinity of the electric motor, of a dedicated area participating in placing the harness in the vicinity of the motor, namely an indexing means.

BRIEF SUMMARY OF THE INVENTION

The invention especially aims to propose an attachment system that does not require the use of a dedicated area of a surface of the tank, or more generally a dedicated area of a surface of the motor vehicle.

To this end, the invention relates to a device for attaching an element to a support formed by a part of a motor vehicle, preferentially by an inner or outer surface of a motor vehicle tank, and/or by a component of the tank intended to be mounted on one of said surfaces, or a chassis or frame comprising a plurality of hydrogen tanks, comprising:

means for retaining said element, and a body capable of being attached to the support, the body being rigidly attached to the retaining means, wherein:

the body comprises a first part and a second part which are rigidly attached, adjacent to one another and elastically deformable, the two parts each have a concave inner surface, the two parts extend in different planes, which are transverse relative to each other, such that the first part is capable of being positioned on a first support area in an engagement direction located in the plane of the first part, and for partially enclosing the first area, and the positioning of the first part on the first support area makes it possible to position the second part relative to a second support area, the second part being capable of deforming in the plane of the second part so as to conform to the shape of the second support area. Preferably, the first part is capable of being clipped onto the first area. Preferably, the second part is capable of being clipped onto the second area.

According to the invention, a concave surface is a hollow surface, in opposition to a convex surface, which protrudes.

The concave inner surfaces are, for example, in the shape of an arc of a circle. The concave inner surface of the first part may be U-shaped.

In the invention, the term "clipping" means attaching by means of a clip forming a spring.

It is considered that the first part partially encloses the first area, when it covers at least 50% of the first area.

The term "plane of a part" is understood to mean the median plane of a part.

It is thus proposed to mount the element by positioning each part of the body on two discrete areas of the support, each part of the body being engaged with a support area, in a different engagement direction. It is thus understood that the second part is installed by extension thereof in a direction in a plane transverse to that in which the engagement direction of the first part is located. It should be understood that "transverse" does not necessarily mean orthogonal or perpendicular, which constitutes a preferred embodiment. Thus an existing shape is used, for example inside or outside the tank, consisting of an accessible shape of a surface of the tank and/or a component of the tank, to install an element.

The invention can easily be used, before or after welding the components of the tank and does not require the presence, on or inside the tank, of a large enough and accessible area for welding or gluing an additional component thereto. It allows rapid and inexpensive installation of the element, avoiding steps of welding, gluing or screwing, not requiring any particular tools. It also guarantees that the component is properly positioned. Furthermore, the body and the retaining means are thus attached in a removable manner. They can easily be removed. It is possible, for example, to easily detach them from the support before recycling, which is of interest for sorting materials.

Preferably, the means for retaining the element can be a clip, a peg, an assembly screw, a pin, a clamping collar, a staple, a crimping, a rivet, a hole for receiving an attachment means.

Advantageously, the plane of the first part is transverse, optionally orthogonal, to the concave inner surface of the first part. Also advantageously, the plane of the second part is transverse, optionally orthogonal, to the concave inner surface of the second part. A plane orthogonal to a concave inner surface is a plane defined by two intersecting straight lines, such that each intersecting straight line is perpendicular to the concave inner surface.

According to other optional features of the attachment device, taken either alone or in combination:

The first part is equipped with first stiffening ribs, preferably located in planes parallel to the plane defined by the first part.

The second part further comprises, at its end opposite its end adjacent to the first part, a wedging means capable of wedging the second part of the body against the second area. The wedging means is for example a lug protruding from the second part.

The second part further comprises, at its end opposite its end adjacent to the first part, a second locking means complementary to a locking means of the second area, for locking the second part in its position positioned on the second area.

The second locking means is a hook capable of attaching to a rib provided on the second area. It is for example possible to take advantage of the presence on the component serving as a support, of a rib, the function of which is to serve as a locator for its installation (its welding). For example, such locating ribs are used on a fill limiting vent valve (FLVV), or a combined valve (CFLVV), or else on a degassing pipette, components that usually equip a fuel tank. On cylindrical supports such as these components, the involvement of the second locking means makes it possible to shorten the length of the second part. Indeed, on a cylindrical support, by virtue of the second locking means, it suffices to extend the second part over about half the circumference of the component, in order to lock the positioning. Alternatively, the second part can be clipped onto the circumference of the component, preferentially over at most three quarters of the circumference of the component.

The means for retaining the element extend from a portion of the second part, so as to be offset relative to the support. This makes it possible to accommodate the element in a large enough space, at a distance from the support.

The portion of the second part from which the retaining means extend comprise second stiffening ribs. This makes it possible to reinforce this portion of the attachment device, subjected to the tensions in connection with the deformation of the second part, and in connection with its function of supporting the retaining means and the element.

The section of the second stiffening ribs has, on the side intended to be positioned on the second area, an angle intended to match a shape of the surface of the second area. This makes it possible to adapt these ribs to certain particular shapes, for example vent valves and degassing pipettes. Indeed, the inventors have contemplated using the attachment device on a cylindrical support, which comprises a flange forming an angle at 135° with the cylindrical surface. To conform to this particular shape, it is proposed for the second stiffening ribs carrying the attachment means to comprise a complementary part, having an angle of 45°.

Advantageously, the means for wedging the second part also has an angle intended to match a shape of the second area.

The first part further comprises, at its end opposite its end adjacent to the second part, a first means capable of locking the first part in its position positioned on the first area, preferably clipped. Advantageously, the first locking means is a tooth intended to be placed under a surface of the support, so as to prevent the unintentional removal of the first part. Due to the angle formed by the flange and the second stiffening ribs, a force exerted in the engagement/removal direction of the first part could result in the opening of the attachment device (by removing the first part). Such a force could be applied for example in the event of a strong deceleration of the vehicle or upon passing over a speed hump. The first locking means prevents the attachment device from opening under these conditions.

The first and second parts, and the means for retaining the element, are based on the same material. This makes it possible to obtain an attachment device in which the connection between the two parts is improved, and the means for retaining the element are stably associated with the two parts of the attachment device, thus making it easier to retain the element in place.

Advantageously, the attachment device is manufactured by injecting a single polymer such as POM (polyoxymethylene), polyamide, polyethylene, or by shaping, for example by molding or bending, a metal in pure or alloyed form.

The means for retaining the element comprise, on a side opposite a side intended to interact with the element, at least one counter-bearing rib. The counter-bearing rib makes it possible, during the assembly of the retaining means with the element, to seek a counter-bearing against the support.

The attachment device is capable of being attached to a support formed by an inner or outer surface of a motor vehicle tank, and/or a component of the tank intended to be mounted on one of said surfaces, or a chassis or frame comprising a plurality of hydrogen tanks.

The invention also relates to a system for attaching an element to a motor vehicle. The attachment system comprises:

a support formed by a part of the motor vehicle, preferentially by an inner or outer surface of a motor vehicle tank, and/or by a component of the tank intended to be mounted on one of said surfaces, or a chassis or frame comprising a plurality of hydrogen tanks, an attachment device as described hereinbefore.

The component is for example a valve equipping a tank, or a sensor, such as a degassing pipette, or any other component which, once mounted on or inside a tank, provides a first and/or second area that can be suitable for the installation of the device according to the invention. Likewise, any surface of the tank having the same characteristics can be used as a support. It may for example be an area of an inner or outer wall of the tank having a structure capable of receiving the body, or even the joint plane of the shells of the tank. The first and second areas may be any surface that can be enclosed respectively in the concave inner surface of the first part, and in the concave inner surface of the second part, that is to say, convex surfaces.

The surfaces of the first and second areas are in the shape of an arc of a circle or consist of at least three consecutive segments, the ends of the at least three segments of which are inscribed in an arc of a circle.

According to other optional features of the attachment system, taken either alone or in combination:

The motor vehicle part is an inner or outer surface of a motor vehicle tank, and/or a component of the tank intended to be mounted on one of said surfaces, or a chassis or frame comprising a plurality of hydrogen tanks.

The support is a fill limiting vent valve (FLVV), or a combined valve (CFLVV), or else a degassing pipette.

These components are particularly interesting since they usually equip fuel tanks and have two areas that are particularly suitable for the installation of the attachment system. Indeed, they have a cylindrical surface that may be suitable for positioning the second part. These components also comprise a duct inlet, for example a duct for venting the valve, which can be useful as a support for the first part. Furthermore, these components comprise a locating rib. It is advantageous to use this rib, located at less than a half-turn from the start of the area for supporting the second part, as third locking means, to which the second locking means can be attached.

The invention also relates to a part of a motor vehicle, on or inside which an element is attached by an attachment system as described hereinbefore. The motor vehicle part may be an inner or outer surface of a motor vehicle tank, and/or a component of the tank intended to be mounted on one of said surfaces, or a chassis or frame comprising a plurality of hydrogen tanks.

The invention also relates to a method for installing an element in a motor vehicle, the installation being carried out by means of an attachment system as described hereinbefore, comprising the following steps:

before or after the mounting of the body on the support of the attachment system, the element is assembled with the retaining means, the first part of the body is positioned on a first support area, in an engagement direction of the first part, and the first area is partially enclosed by the first part, preferentially clipped, the second part of the body is positioned on the second support area, by extending the second part in a direction in a plane transverse to that in which the engagement direction of the first part is situated, preferentially clipped.

Preferentially, the step of positioning the first part of the body precedes the step of positioning the second part of the body on the second support area.

BRIEF DESCRIPTION OF THE FIGURES

The invention will be better understood upon reading the following description, which is provided merely as example and with reference to the appended drawings, wherein:

FIGS. 1a and 1b are top views of an attachment device according to one embodiment of the invention, illustrating steps of the installation of an element on a part of a motor vehicle;

FIG. 2 is a side view of the attachment device of FIGS. 1a and 1b attached to a part of a motor vehicle;

FIG. 3 is a perspective view of a part of the attachment device attached to the motor vehicle part of FIGS. 1a and 1b;

FIGS. 4a, 4b and 4c are perspective views of the attachment device of FIGS. 1a and 1b, illustrating steps of the installation of an element on a part of a motor vehicle.

DETAILED DESCRIPTION

FIGS. 1 to 4 depict an attachment device according to one embodiment of the invention, designated by the general reference 1. The device 1 is a device for attaching an element (not shown) to a support 3. The support 3 is formed by a part of a motor vehicle. In the example depicted, the support 3 is a component of a motor vehicle tank, more specifically of a fuel tank (not shown). In particular, this is a combined fill limiting vent valve (CFLVV). The attachment device 1 comprises means 5 for retaining the element. In the example depicted, the means 5 for retaining the element are a clip. The attachment device 1 also comprises a body 7 capable of being attached to the support 3. The body 7 is rigidly attached to the means 5 for retaining the element. The body 7 comprises a first part 9 and a second part 11. They are rigidly attached and adjacent to one another. They are elastically deformable. The first part 9 has a concave inner surface 9i and the second part 11 has a concave inner surface 11i. The first part 9 extends in a plane P9. The second part 11 extends in a plane P11. The planes P9 and P11 are different. They are transverse relative to each other. In the embodiment depicted, the planes P9 and P11 are orthogonal. The plane P9 of the first part 9 is transverse to the concave inner surface 9i of the first part 9, and the plane P11 of the second part 11 is transverse to the concave inner surface 11i of the second part 11. More precisely, the plane P9 of the first part 9 is orthogonal to the concave inner surface 9i, and the plane P11 of the second part 11 is orthogonal to the concave inner surface 11i of the second part 11. The attachment device 1 is formed such that the first part 9 is capable of being positioned on a first area 13 of the support 3 in an engagement direction D1 visible in FIG. 4a, located in the plane P9 of the first part 9, and for partially enclosing the first area 13, and the positioning of the first part 9 on the first area 13 makes it possible to position the second part 11 relative to a second area 15 of the support 3, and the second part 11 is capable of deforming in its plane P11 so as to conform to the shape of the second area 15 of the support 3. In the example depicted, an existing shape is therefore used, namely a CFLVV valve, for attaching an element to the outside of a fuel tank.

The assembly of the support 3 and the attachment device 1 forms a system 17 for attaching an element.

In the embodiment depicted, the first part 9 is equipped with first stiffening ribs 19. These are located in planes P19 depicted in FIG. 1a, parallel to the plane P9 defined by the first part 9.

The second part 11 of the attachment device 1 comprises an end 11a adjacent to the first part 9, and an end 11b opposite the latter. At its end 11b, the second part 11 depicted in the figures further comprises a means 21 for wedging the second part 11 of the body 7 against the second area 15, visible in particular in FIG. 4. In this embodiment, the wedging means 21 is a lug protruding from the second part 11.

In this embodiment, the second part 11 further comprises at its end 11b a second means 23 for locking the second part 11 in its position positioned on the second area 15 of the support 3. The second locking means 23 is complementary to a locking means 25 of the second area 15. These locking means 23, 25 are visible in particular in FIG. 4. In the attachment device 1 depicted, the second locking means 23 is a hook capable of being attached to a rib 25 provided on the second area 15. In the example depicted, the rib 25 is a locating rib of the CFLVV valve 3. On a cylindrical support like this CFLVV valve, the involvement of the second locking means 23 makes it possible to shorten the length of the second part 11. Indeed, it suffices to extend the second part 11 over about half the circumference of the CFLVV valve 3 in order to lock the positioning, as can be seen in FIGS. 4c and 1b.

In the embodiment depicted, the means 5 for retaining the element extend from a portion 27 of the second part 11, so as to be offset relative to the support 3. This makes it possible to accommodate the element in a large enough space, at a distance from the support 3. In the example depicted, the portion 27 comprises second stiffening ribs 29.

As can be seen in particular in FIG. 2, the CFLVV valve 3 comprises a flange 31, which forms with its cylindrical surface an angle of 135°, conferring a particular shape 33 on the surface of the second area 15. In order to match this shape 33, the side 35 of the section of the second stiffening ribs 29 of the portion 27 of the second part 11 has an angle α. In the example depicted, the angle α is 45°. As can be seen in particular in FIG. 4a, the means 21 for wedging the second part 11 may also have an angle intended to match the shape of the second area 15.

The first part 9 of the attachment device 1 comprises an end 9a adjacent to the second part 11, and an end 9b opposite the latter. As can be seen in particular in FIG. 2, the first part 9 further comprises at its end 9b a first means 37 capable of locking the first part 9 in its position positioned on the first area 13. In the example depicted, the first locking means 37 is a tooth intended to be placed under a surface of the support 3, so as to prevent the unintentional removal of the first part 9. Indeed, due to the shape 33 of the surface of the second area (herein the angle of 135° Formed between the flange 31 and the cylindrical surface of the CFLVV valve 3), a force exerted in the engagement/removal direction of the first part could lead to the opening of the attachment device 1 (by removing the first part 9). Such a force could be applied for example in the event of a strong deceleration of the vehicle or upon passing over a speed hump. The first locking means 37 prevents the opening of the attachment device 1 under these conditions.

In one variant, the first part 9, the second part 11, and the means 5 for retaining the element, are based on the same material. The attachment device 1 is for example manufactured by injecting a single polymer such as POM (polyoxymethylene), polyamide, polyethylene, or by shaping a metal in pure or alloyed form.

As can be seen in particular in FIG. 3, the retaining means comprise a side 39 intended to interact with the element, and a side 41 opposite the latter. On the side 41, the means 5 for retaining the element comprise at least one counter-bearing rib 43. The counter-bearing rib 43 makes it possible, during the assembly of the retaining means 5 with the element, to seek a counter-bearing on the support 3.

The installation of the element in the motor vehicle, by means of the attachment system 17, is carried out in the following way. Before or after the mounting of the body 7 on the support 3 of the attachment system 17, the element (not shown) is assembled with the means 5 for retaining the element. The first part 9 of the body 7 is positioned on the first area 13 of the support 3, in the engagement direction D1 of the first part 9, and the first area 13 is partially enclosed by the first part 9, as can be seen in particular in FIG. 4a. Then, the second part 11 of the body 7 is positioned on the second area 15 of the support 3, by extending the second part

11 in a direction D2 in a plane P11 transverse to the plane P9 wherein the engagement direction D1 of the first part is located. In this way, the second part 11 is positioned on the second area 15, as can be seen in FIGS. 1b and 5c. If necessary, the positioning of the second part 11 on the second area 15 is locked by virtue of the locking means 23 and 25. If necessary also, the first part 9 is locked in position positioned on the first area 13 by virtue of the first locking means 37.

The invention is not limited to the embodiment presented, and other embodiments will become clearly apparent to those skilled in the art. It is especially possible for the support of the attachment system to be another part of a motor vehicle, and in particular an inner or outer surface of a motor vehicle tank, and/or another component of the tank intended to be mounted on one of said surfaces, or a chassis or frame comprising a plurality of hydrogen tanks. It may for example also be another component such as a degassing pipette. The means for retaining the element are not limited to a clip. They can be any means for retaining an element known to the skilled person.

The invention claimed is:

1. An attachment device for attaching an element to a support formed by a part of a motor vehicle, comprising:
   a means for retaining the element; and
   a body capable of being attached to the support, the body being rigidly attached to the means for retaining the element,
   wherein:
   the body comprises a first part and a second part which are rigidly attached, adjacent to one another and elastically deformable,
   the first part and the second part each have a concave inner surface,
   the first part and the second part extend in different planes, transverse relative to each other, such that the first part is capable of being positioned on a first area of the support in an engagement direction located in a plane of the first part, and for partially enclosing the first area, and the positioning makes it possible to position the second part relative to a second area of the support, the second part being capable of deforming in a plane of the second part so as to conform to a shape of the second area of the support,
   wherein the second part further comprises, at an end opposite an end adjacent to the first part, a second locking means complementary to a locking means of the second area, for locking the second part in a position positioned on the second area, and
   wherein the second locking means is a hook capable of being attached on a rib provided on the second area.

2. The attachment device according to claim 1, wherein the first part is equipped with first stiffening ribs, located in planes parallel to the plane of the first part.

3. The attachment device according to claim 1, wherein the second part further comprises, at the end opposite the end adjacent to the first part, a wedging means capable of wedging the second part of the body against the second area.

4. The attachment device according to claim 1, wherein the means for retaining the element extend from a portion of the second part, so as to be offset relative to the support.

5. The attachment device according to claim 4, wherein said portion comprises second stiffening ribs.

6. The attachment device according to claim 5, wherein a section of the second stiffening ribs has, on a side intended to be positioned on the second area, an angle intended to match a shape of a surface of the second area.

7. The attachment device according to claim 6, wherein the first part further comprises, at an end opposite an end adjacent to the second part, a first means capable of locking the first part in a positioned position.

8. The attachment device according to claim 1, wherein the first part, the second part, and the means for retaining the element, are based on the same material.

9. The attachment device according to claim 1, wherein the means for retaining the element comprise, on one side opposite a side intended to interact with the element, at least one counter-bearing rib.

10. The attachment device according to claim 1, wherein the support is formed by at least one of an inner or outer surface of a motor vehicle tank and a component of the tank intended to be mounted on one of said surfaces, or a chassis or frame comprising a plurality of hydrogen tanks.

11. An attachment system for attaching an element to a motor vehicle, said attachment system comprising:

a support formed by a part of the motor vehicle, and the attachment device according to claim 1.

12. The attachment system according to claim 11, wherein the part of the motor vehicle is at least one of an inner or outer surface of a motor vehicle tank and a component of the tank intended to be mounted on one of said surfaces, or a chassis or frame comprising a plurality of hydrogen tanks.

13. The attachment system according to claim 11, wherein the support is a fill limiting vent valve (FLVV), a combined valve (CFLVV), or a degassing pipette.

14. A part of a motor vehicle, on or inside which an element is attached by an attachment system according to claim 11.

15. The part of the motor vehicle according to claim 14, consisting of at least one of an inner or outer surface of a motor vehicle tank and a component of the tank intended to be mounted on one of said surfaces, or a chassis or frame comprising a plurality of hydrogen tanks.

16. An installation method for installing an element in a motor vehicle, the installation being carried out by means of the attachment system according to claim 11, the installation method comprising:

assembling the element with the means for retaining the element;

mounting the body on the support of the attachment system;

positioning the first part of the body on a first area of the support, in an engagement direction of the first part, and the first area is partially enclosed by the first part, and positioning the second part of the body on the second area of the support, by extending the second part in a direction in a plane transverse to the plane of the first part wherein the engagement direction of the first part is located, wherein the assembling is before or after the mounting.

17. The installation method according to claim 16, wherein the positioning the first part of the body precedes the positioning the second part of the body on the second area of the support.

\*   \*   \*   \*   \*